United States Patent
Shim et al.

(10) Patent No.: US 10,019,929 B2
(45) Date of Patent: Jul. 10, 2018

(54) GATE DRIVE CIRCUIT AND DISPLAY DEVICE USING THE SAME

(71) Applicant: LG Display Co., Ltd., Seoul (KR)

(72) Inventors: Dahye Shim, Seoul (KR); Joungmi Choi, Gyeonggi-do (KR); Youngsung Cho, Gyeonggi-do (KR); Jiah Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 163 days.

(21) Appl. No.: 14/983,736

(22) Filed: Dec. 30, 2015

(65) Prior Publication Data
US 2017/0032731 A1 Feb. 2, 2017

(30) Foreign Application Priority Data
Jul. 31, 2015 (KR) .................. 10-2015-0109206

(51) Int. Cl.
G06F 3/038 (2013.01)
G09G 5/00 (2006.01)
G09G 3/20 (2006.01)
G09G 3/36 (2006.01)
G06F 1/26 (2006.01)

(52) U.S. Cl.
CPC ........... *G09G 3/2092* (2013.01); *G06F 1/263* (2013.01); *G09G 3/3677* (2013.01); *G09G 2300/0426* (2013.01); *G09G 2300/08* (2013.01); *G09G 2310/0267* (2013.01); *G09G 2310/0286* (2013.01); *G09G 2310/08* (2013.01); *G09G 2330/026* (2013.01); *G09G 2330/027* (2013.01); *G09G 2330/028* (2013.01)

(58) Field of Classification Search
None
See application file for complete search history.

(56) References Cited

U.S. PATENT DOCUMENTS

| 2002/0093495 | A1* | 7/2002 | Akimoto | G09G 3/2011 |
| | | | | 345/204 |
| 2006/0139292 | A1 | 6/2006 | Yoon et al. | |
| 2008/0219401 | A1 | 9/2008 | Tobita | |
| 2011/0148853 | A1* | 6/2011 | Ko | G09G 3/3677 |
| | | | | 345/213 |

(Continued)

FOREIGN PATENT DOCUMENTS

| EP | 2827335 A1 | 1/2015 |
| WO | 2014174889 A1 | 10/2014 |

OTHER PUBLICATIONS

European Search Report, dated Apr. 18, 2016, for the counterpart European Patent Application No. 15203147.2.

*Primary Examiner* — Stephen T Reed
(74) *Attorney, Agent, or Firm* — Morgan, Lewis & Bockius LLP

(57) ABSTRACT

A display device having a plurality of gate lines and a gate drive circuit is disclosed. The gate drive circuit includes a pull-up transistor configured to receive a first clock signal and to charge an output node to a voltage of the first clock signal based on a voltage of a Q node. The output node is connected to a corresponding one of the gate lines. The gate drive circuit also includes a switching circuit configured to charge the Q node based on a second clock signal. The switching circuit has an inverter circuit configured to control the voltage of the Q node based on the second clock signal.

12 Claims, 14 Drawing Sheets

(56) References Cited

U.S. PATENT DOCUMENTS

| | | |
|---|---|---|
| 2011/0193853 A1 | 8/2011 | Sakamoto et al. |
| 2012/0121061 A1 | 5/2012 | Sakamoto et al. |
| 2012/0269316 A1* | 10/2012 | Jang .................... G09G 3/3677 |
| | | 377/75 |
| 2015/0030116 A1 | 1/2015 | Horiuchi et al. |
| 2016/0063955 A1 | 3/2016 | Yamamoto et al. |

* cited by examiner

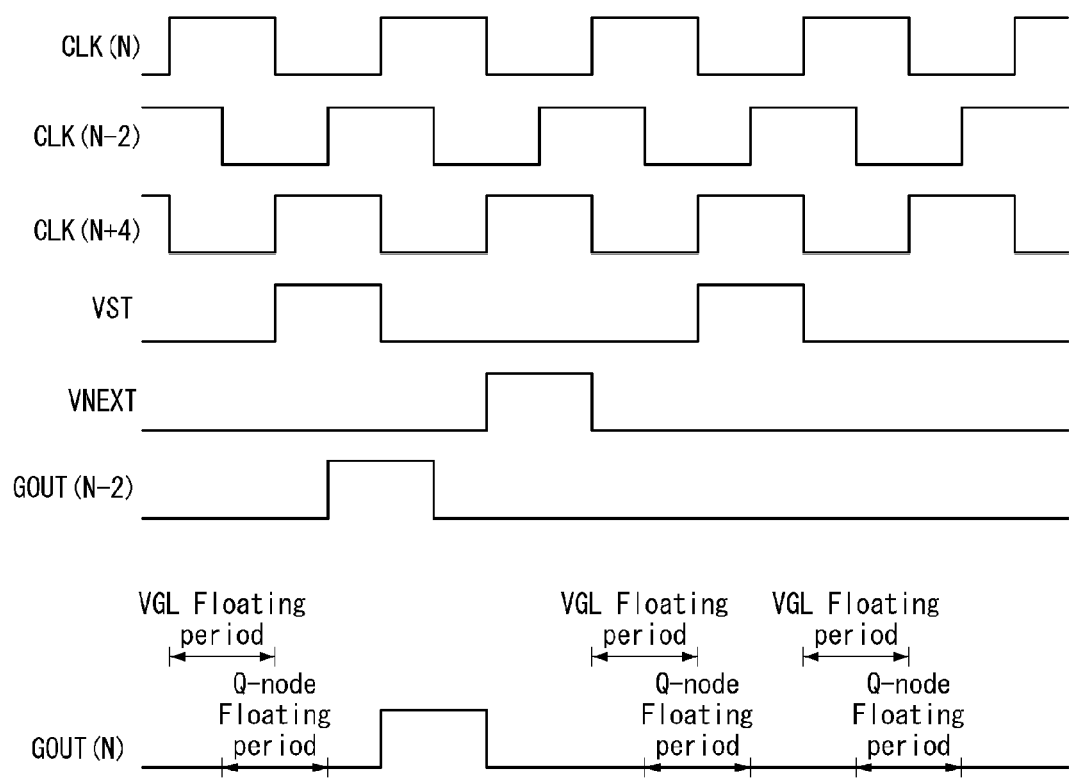

PANEL ON  PANEL OFF

— GATE DRIVE CIRCUIT AND DISPLAY DEVICE USING THE SAME —

This application claims the benefit of Korean Patent Application No. 10-2015-0109206 filed on Jul. 31, 2015, the entire contents of which are incorporated herein by reference for all purposes as if fully set forth herein.

BACKGROUND OF THE INVENTION

Field of the Invention

The present invention relates to a gate drive circuit and a display device using the same, and more particularly, to a gate drive circuit capable of improving reliability in a low-temperature environment and a display device using the same.

Discussion of the Related Art

Examples of flat panel displays include a liquid crystal display device (LCD), an organic light emitting diode display (hereinafter, "OLED display"), a plasma display panel (PDP), and an electrophoretic display (EPD) device.

A display device driving circuit comprises a pixel array for displaying an image, a data drive circuit for supplying a data signal to the data lines of the pixel array, a gate drive circuit (or scan drive circuit) for sequentially supplying a gate pulse (or scan pulse) to the gate lines (or scan lines) of the pixel array, and a timing controller for controlling the data drive circuit and the gate drive circuit.

Each pixel may comprise a thin film transistor (TFT) that supplies the voltage of the data lines to a pixel electrode in response to a gate pulse supplied through the gate lines. The gate pulse swings between a gate-high voltage (VGH) and a gate-low voltage (VGL). The gate-high voltage (VGH) is set higher than a threshold voltage of the pixel TFT, and the gate-low voltage VGL is set lower than the threshold voltage of the pixel TFT. The TFTs of the pixels are turned on in response to the gate-high voltage.

The technology for embedding the gate drive circuit, along with the pixel array, in a display panel is now used. The gate drive circuit embedded in the display panel is known as a "GIP (Gate In Pane)". The GIP circuit comprises a shift register. The shift register comprises multiple stages connected in cascade. The stages produce an output in response to a start pulse and shift the output in synchronization with a shift clock.

The stages of the shift register each comprise a Q node for charging the gate lines, a QB node for discharging the gate lines, and a switching circuit connected to the Q node and the QB node. The switching circuit charges the Q node in response to the start pulse or the output of the previous stage to raise the voltage of the gate lines, and discharges the QB node in response to the output of the next stage or a reset pulse. The switching circuit comprises TFTs with a MOSFET (Metal Oxide Semiconductor Field Effect Transistor) structure.

The number of TFTs used for mobile devices such as smartphones is becoming fewer in order to reduce the bezel of the display panel. A fewer number of TFTs may cause floating periods in which no voltage is applied to the Q node and an output node. In these floating periods, the voltages of the Q node and the output node fluctuate with a clock applied through a parasitic capacitance and the output voltages of other stages. Hence, the gate drive circuit of a mobile device may produce an unstable output due to the floating periods.

The TFT's device characteristics may change with a DC gate bias stress or the temperature in the operating environment. The higher the DC voltage applied to the gate of the TFT and the longer the voltage is applied, the greater the DC gate bias stress. The threshold voltage of the TFT may be shifted by the DC gate bias stress, thereby reducing the on current Ion. The shift in the threshold voltage of the TFT may degrade the picture quality and shorten the lifetime of the display device.

SUMMARY

Accordingly, the present invention is directed to a gate drive circuit and a display device using the same that substantially obviate one or more of the problems due to limitations and disadvantages of the related art.

An object of the present invention is to provide a gate drive circuit for stabilizing output voltages and compensating for stress on a pull-down transistor.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a gate drive circuit for a display device having a plurality of gate lines comprises: a pull-up transistor configured to receive a first clock signal and to charge an output node to a voltage of the first clock signal based on a voltage of a Q node, the output node being connected to a corresponding one of the gate lines; and a switching circuit configured to charge the Q node based on a second clock signal, the switching circuit having an inverter circuit configured to control the voltage of the Q node based on the second clock signal, wherein the inverter circuit includes a first transistor having a gate configured to receive the second clock signal via an inverter input node, a drain connected to the Q node, and a source configured to receive a first low-potential voltage, and a second transistor having a drain connected to the inverter input node, a gate connected to the Q node, and a source configured to receive the first low-potential voltage.

In another aspect, a gate drive circuit for a display device having a plurality of gate lines comprises: a pull-up transistor configured to receive a clock signal and to charge an output node to a voltage of the clock signal based on a voltage of a Q node, the output node being connected to a corresponding one of the gate lines; a first pull-down transistor configured to discharge the output node to a first low-potential voltage based on a voltage of a first QB node; and a switching circuit configured to control the voltage of the Q node and the voltage of the first QB node, wherein a gate-source voltage of the first pull-down transistor is a positive voltage during a first time period and is a negative voltage during a second time period.

In an additional aspect, a display device comprises: a display panel having data lines and gate lines intersecting each other and pixels arranged in a matrix form; a timing controller configured to supply a first clock signal and a second clock signal; a data drive circuit configured to supply a data signal to the data lines; and a gate drive circuit configured to supply a gate pulse synchronized with the data signal to the gate lines, the gate drive circuit including a pull-up transistor configured to receive the first clock signal and to charge an output node to a voltage of the first clock signal based on a voltage of a Q node, the output node being connected to a corresponding one of the gate lines, and a switching circuit configured to charge the Q node based on the second clock signal, the switching circuit having an inverter circuit configured to control the voltage of the Q node based on the second clock signal, wherein the inverter circuit includes a first transistor having a gate configured to receive the second clock signal via an inverter input node, a drain connected to the Q node, and a source configured to receive a first low-potential voltage, and a second transistor having a drain connected to the inverter input node, a gate connected to the Q node, and a source configured to receive the first low-potential voltage.

In yet another aspect, a display device comprises: a display panel having data lines and gate lines intersecting each other and pixels arranged in a matrix form; a timing controller configured to supply a clock signal; a data drive circuit configured to supply a data signal to the data lines; and a gate drive circuit configured to supply a gate pulse synchronized with the data signal to the gate lines, the gate drive circuit including a pull-up transistor configured to receive the clock signal and to charge an output node to a voltage of the clock signal based on a voltage of a Q node, the output node being connected to a corresponding one of the gate lines, a first pull-down transistor configured to discharge the output node to a first low-potential voltage based on a voltage of a first QB node, and a switching circuit configured to control the voltage of the Q node and the voltage of the first QB node, wherein a gate-source voltage of the first pull-down transistor is a positive voltage during a first time period and is a negative voltage during a second time period.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate example embodiments of the invention and together with the description serve to explain the principles of the invention. In the drawings:

FIGS. 5A and 5B are waveform diagrams showing a Q node floating period and a VGL floating period, in the example circuit shown in FIG. 4;

DETAILED DESCRIPTION OF EXAMPLE EMBODIMENTS

Figure 1:
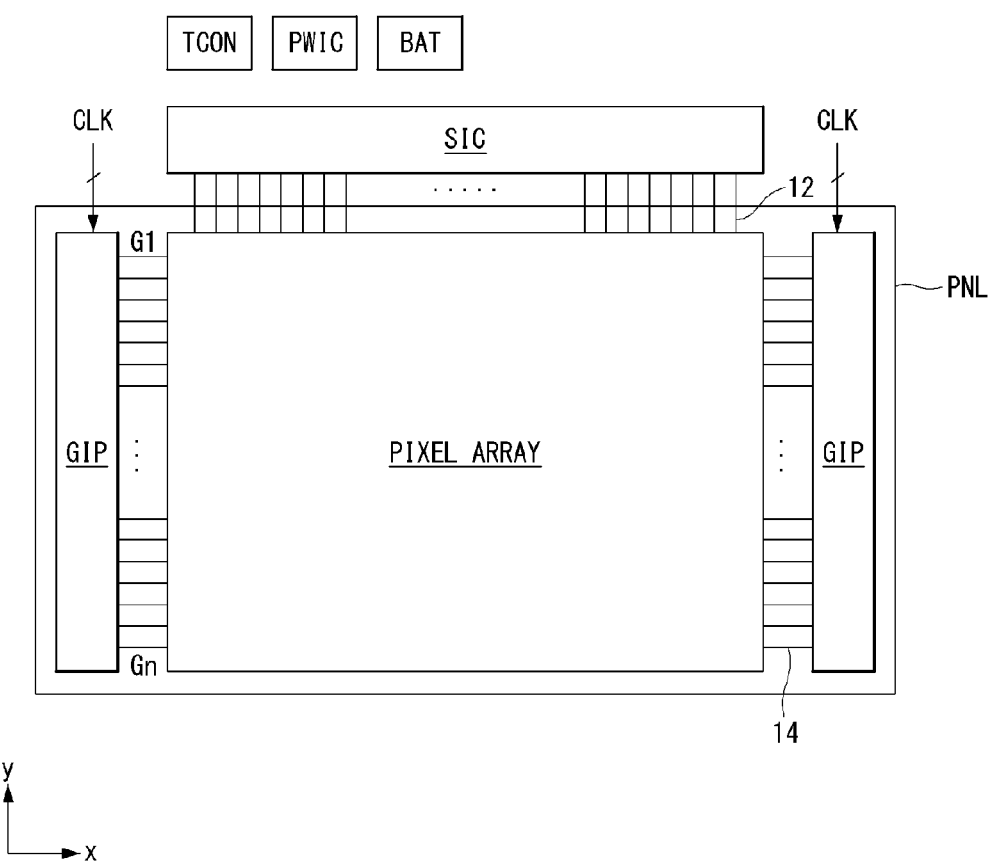
FIG. 1 is a block diagram showing a display device driving circuit according to an example embodiment of the present invention.

A display device of this invention may be implemented on the basis of a flat panel display such as a liquid crystal display (LCD), an organic light emitting diode (OLED) display, a plasma display panel (PDP), or an electrophoretic display (EPD) device.

Hereinafter, example embodiments of the present invention will be described in detail with reference to the accompanying drawings. Like reference numerals refer to like elements throughout the specification. In the following description, detailed descriptions of well-known functions or configurations may be omitted where they may unnecessarily obscure the subject matters of the present invention.

Figure 2:
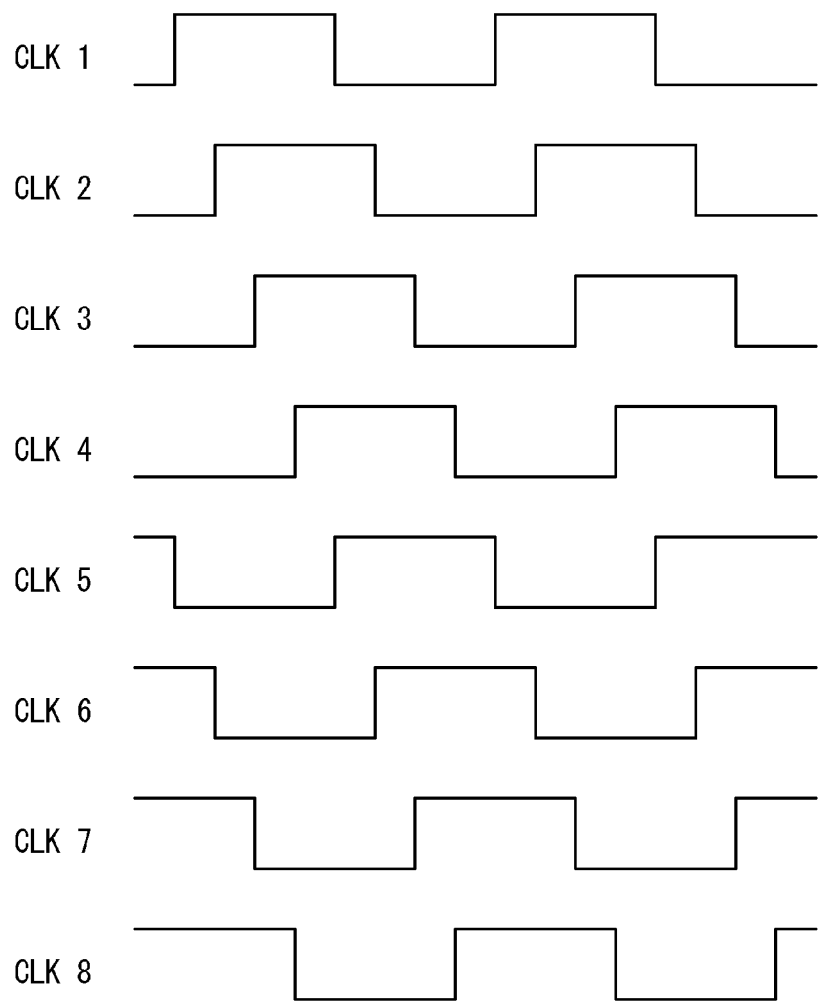
FIG. 2 is a waveform diagram showing an example of shift clocks supplied to a gate drive circuit.
Figure 3:
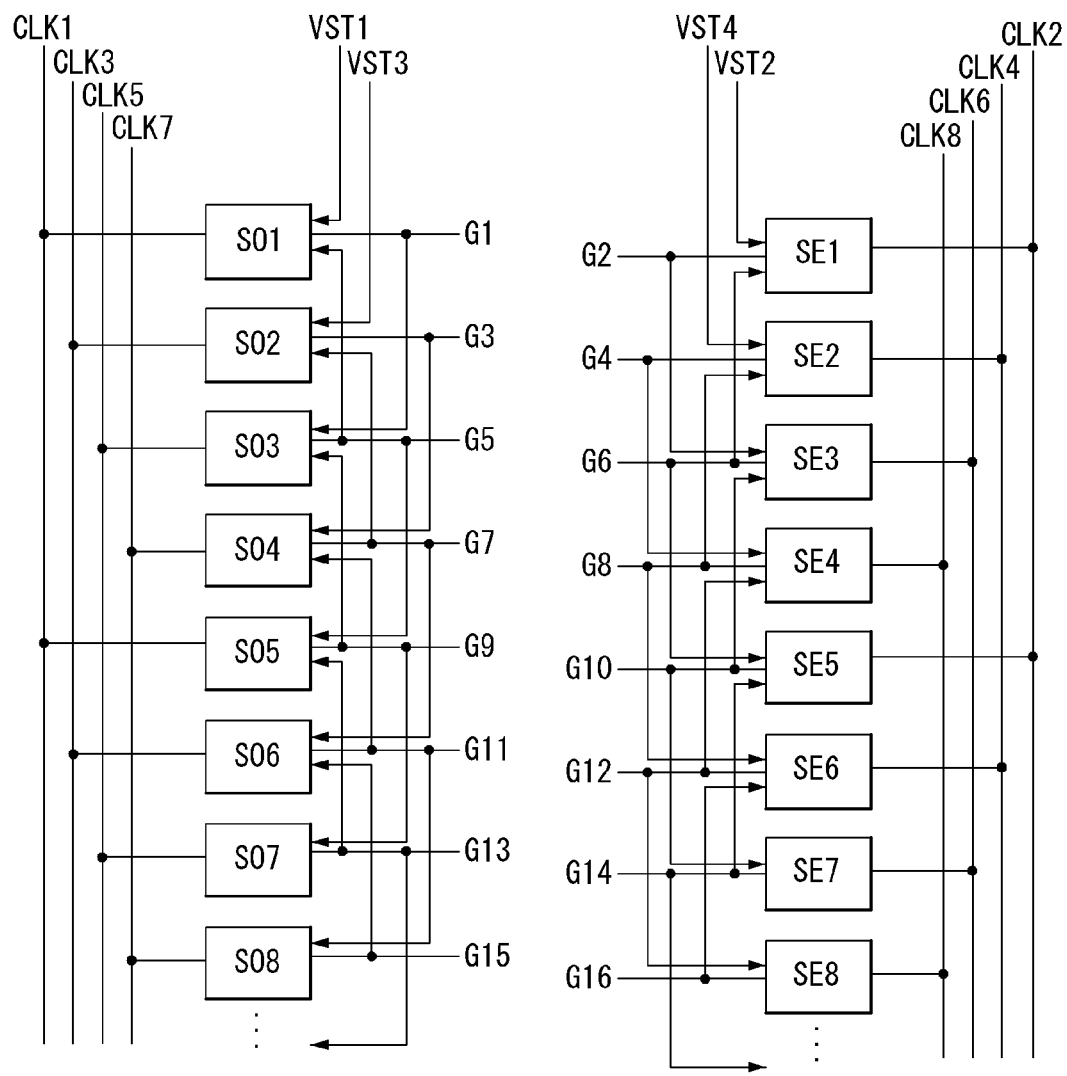
FIG. 3 is a view showing an example configuration of stages with floating periods at a Q node and an output node.

As shown in FIGS. 1 to 3, a display device according to an example embodiment of the present invention comprises a display panel PNL, and a display panel driving circuit for writing data of an input image to the pixel array of the display panel PNL.

The display panel PNL comprises data lines 12, gate lines 14 intersecting the data lines 12, and a pixel array with pixels arranged in a matrix defined by the data lines 12 and the gate lines 14. The input image is reproduced in the pixel array.

The display panel driving circuit may comprise a data drive circuit SIC for supplying a data signal to the data lines 12, a gate drive circuit GIP for sequentially supplying a gate pulse synchronized with the data signal to the gate lines 14, and a timing controller TCON. The display panel driving circuit may further comprise a module power supply part PWIC and an auxiliary power supply part BAT.

The timing controller TCON transmits digital data of an input image to the data drive circuit SIC, and controls the operation timings of the data drive circuit SIC and gate drive circuit GIP. The data drive circuit SIC converts digital video data of an input image input from the timing controller TCON to an analog gamma compensation voltage and outputs a data voltage. The data voltage output from the data drive circuit SIC is supplied to the data lines 12.

The module power supply part PWIC generates operating voltages, such as VGH, VGL, and a gamma reference voltage, required to drive the display panel PNL by a DC power supplied to the display device. The gamma reference voltage is divided into gamma compensation voltages by a voltage dividing circuit and supplied to a DAC (digital-to-analog converter) of the data drive circuit SIC. The DAC converts digital video data of an input image into a gamma reference voltage.

The auxiliary power supply part BAT is charged with an electric charge when power is supplied to the display device, and temporarily supplies power to the timing controller TCON and the module power supply part PWIC when the power of the display device is turned off, thereby temporarily extending the driving time of the timing controller TCON beyond the power-off of the display device. The auxiliary power supply part BAT drives the timing controller TCON and the module power supply part PWIC for a predetermined length of time after the power-off so that the characteristics of a pull-down transistor in the gate drive circuit GIP may be recovered after a power-off period during which the display panel PNL is not driven.

The gate drive circuit GIP may be formed on one edge or multiple edges of the display panel PNL outside the pixel array. The gate drive circuit GIP may comprise a shift register into which start pulses VST1 to VST4 and shift clocks CLK1 to CLK8 are input. The example shift clocks CLK1 to CLK8 illustrated in FIG. 2 are 8-phase shift clocks, but the present invention is not limited thereto.

If the gate drive circuit GIP is disposed on both lateral sides of the pixel array, the left gate drive circuit GIP may comprise a first shift register that is disposed on the left side of the display panel PNL and sequentially supplies a gate pulse to odd-numbered gate lines G1, G3, . . . , Gn−1. The right gate drive circuit GIP may comprise a second shift register that is disposed on the right side of the display panel PNL and sequentially supplies a gate pulse to even-numbered gate lines G2, G4, . . . , Gn.

The first shift register may comprise stages SO1 to SO8 connected in cascade as shown in FIG. 3. The odd-numbered stages SO1, SO3, SO5, and SO7 start to output a gate pulse in response to a first start pulse VST1, and shift the output in response to a first shift clock CLK1 or a fifth shift clock CLK5. The output signal from each of the odd-numbered stages SO1, SO3, SO5, and SO7 is input as a start pulse for the next odd-numbered stage. Also, the output signal is input into the previous odd-numbered stage to discharge the Q node.

The even-numbered stages SO2, SO4, SO6, and SO8 start to output a gate pulse in response to a third start pulse VST3, and shift the output in response to a third shift clock CLK3 or a seventh shift clock CLK7. The output signal from each of the even-numbered stages SO2, SO4, SO6, and SO8 is input as a start pulse for the next even-numbered stage, and the output signal is also input into the previous even-numbered stage to discharge the Q node. The output signals sequentially output from the stages SO1 to SO8 are supplied as gate pulses to the odd-numbered gate lines G1, G3, G5, G7, . . . , G15, respectively.

The second shift register may comprise stages SE1 to SE8 connected in cascade as shown in FIG. 3. The odd-numbered stages SE1, SE3, SE5, and SE7 start to output a gate pulse in response to a second start pulse VST2, and shift the output in response to a second shift clock CLK2 or a sixth shift clock CLK6. The output signal from each of the odd-numbered stages SE1, SE3, SE5, and SE7 is input as a start pulse for the next odd-numbered stage. Also, the output signal is input into the previous odd-numbered stage to discharge the Q node.

The even-numbered stages SE2, SE4, SE6, and SE8 start to output a gate pulse in response to a fourth start pulse VST4, and shift the output in response to a fourth shift clock CLK4 or an eighth shift clock CLK8. The output signal from each of the even-numbered stages SE2, SE4, SE6, and SE8 is input as a start pulse for the next even-numbered stage, and the output signal is also input into the previous even-numbered stage to discharge the Q node. The output signals sequentially output from the stages SE1 to SE8 are supplied as gate pulses to the even-numbered gate lines G2, G4, G6, G8, . . . , G16, respectively.

A stage circuit for a shift register may be implemented in various forms depending on the device used. As an example, the example stage circuit of FIG. 3 can minimize the number of TFTs but may have floating periods at the Q node and the output node.

Figure 4:
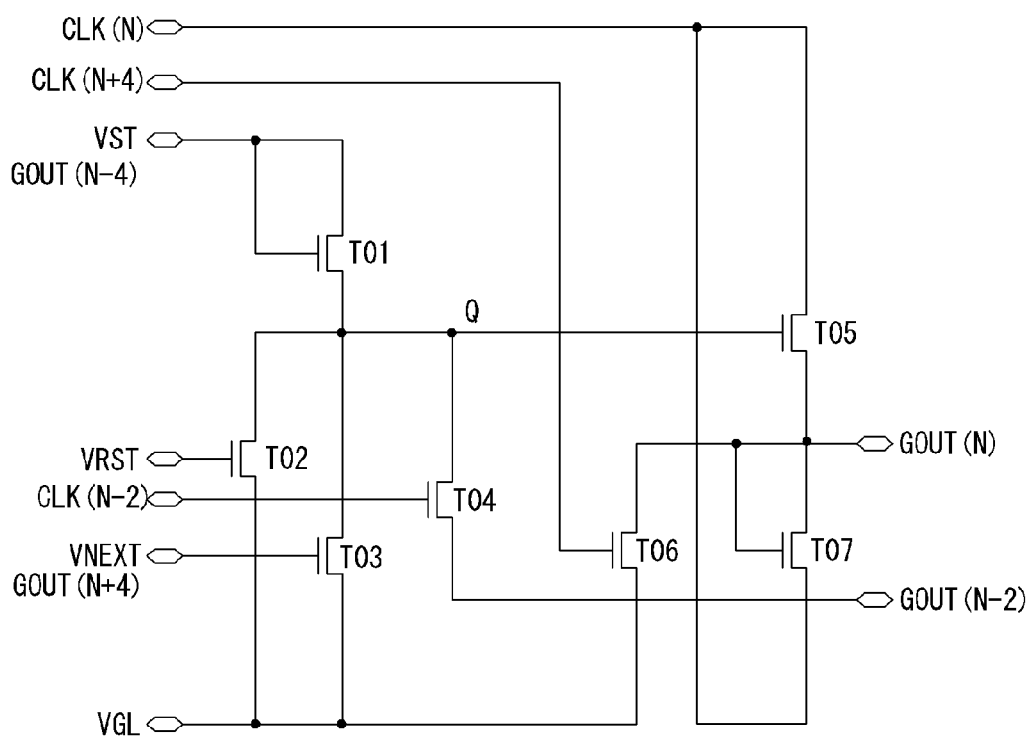
FIG. 4 is a view showing an example of the gate drive circuit.

As shown in FIG. 4, an N-th stage (N is a positive integer) comprises a switching circuit for charging or discharging the Q node in response to a clock signal. The switching circuit may include a plurality of switching elements T01 to T07. The switching elements T01 to T07 may be implemented as MOSFETs. The output node of the N-th stage GOUT(N) is connected to the source of the fifth TFT T05 and the drains of the sixth and seventh TFTs T06 and T07, and the corresponding gate lines.

VST, shift clocks CLK(N), CLK(N−2), and CLK(N+4), VRST, VNEXT, and VGL are supplied to this stage. VRST is a reset signal that is applied commonly to all the stages, and discharges and resets the Q nodes of those stages. VST is a start pulse or the output voltage of the previous stage. The output voltage of the previous stage may be the output voltage GOUT(N−4) of the (N−4)-th stage. VNEXT is the output voltage of the next stage. The next stage may be the (N+4)-th stage. VGL is the gate-low voltage. VST, the shift clocks CLK(N), CLK(N−2), and CLK(N+4), VRST, and VNEXT each swing between the gate-high voltage VGH and the gate-low voltage VGL.

The first TFT T01 operates as a diode that supplies VST to the Q node Q and charges the Q node Q. The gate and drain of the first TFT T01 are connected to a VST node to which VST is supplied. The source of the first TFT T01 is connected to the Q node Q. The second TFT T02 discharges the Q node Q in response to VRST to reset the Q node Q. The gate of the second TFT T02 is connected to a VRST node to which VRST is supplied. The drain of the second TFT T02 is connected to the Q node Q. The source of the second TFT T02 is connected to a VGL node to which VGL is supplied. The third TFT T03 discharges the Q node Q in response to VNEXT. The gate of the third TFT T03 is connected to a VNEXT node to which VNEXT is supplied. The drain of the third TFT T03 is connected to the Q node Q. The source of the third TFT T03 is connected to the VGL node.

The fourth TFT T04 supplies the output voltage GOUT(N−2) of the (N−2)-th stage to the Q node Q. CLK(N−2) is supplied to the gate of the fourth TFT T04. The drain of the fourth TFT T04 is connected to the Q node, and the source of the fourth TFT T04 is connected to the output node GOUT(N−2) of the (N−2)-th stage.

The fifth TFT T05 is a pull-up transistor that supplies the voltage of CLK(N) to the output node of the N-th stage and raises the voltage GOUT(N) of the output node. The fifth TFT T05 causes gate pulses to rise by charging the output node GOUT(N) with the voltage of CLK(N) when the Q node Q is charged to VGH by VST. After the Q node is charged to VGH by VST, the voltage of the Q node rises up to 2VGH by bootstrapping, which, when CLK(N) is supplied, causes the potential to rise up to the voltage of the clock, thereby turning on the fifth TFT T05. The gate of the fifth TFT T05 is connected to the Q node. CLK(N) is supplied to the drain of the fifth TFT T05, and the output node GOUT(N) is connected to the source of the fifth TFT T05.

The sixth TFT T06 is a pull-down transistor that discharges the output node GOUT(N). The sixth TFT T06 causes gate pulses to fall by discharging the output node GOUT(N) in response to CLK(N+4). CLK(N+4) is supplied to the gate of the sixth TFT T06. The output node GOUT(N) is connected to the drain of the sixth TFT T06. VGL is supplied to the source of the sixth TFT T06.

The gate and drain of the seventh TFT T07 are connected to the output node GOUT(N). CLK(N) is supplied to the source of the seventh TFT T07.

When VST is applied to the N-th stage, the first TFT T01 is turned on and the voltage of the Q node Q rises up to VGH. As a consequence, the fifth TFT T05 is turned on and the voltage of CLK(N) is output to the output node GOUT(N). When VNEXT is applied to the third TFT T03, the third TFT T03 is turned on to discharge the Q node Q to the VGL potential, and the fifth TFT T05 is turned off. As a consequence, the gate pulse rises when CLK(N) is generated, and falls when VNEXT is input. When CLK(N+4), which has a phase opposite to that of CLK(N), is input into the gate of the sixth TFT T06, the sixth TFT T06 discharges the output node GOUT(N) to the VGL potential by connecting the output node GOUT(N) to the VGL node. The fourth TFT T04 is turned on in response to the gate high voltage, i.e., VGH, of CLK(N−2), in order to prevent fluctuation of the voltage of the Q node Q due to coupling with CLK(N) when the Q node Q is floating. Once the fourth TFT T04 is turned on, the Q node Q is connected to the output node GOUT(N−2) of the (N−2)-th stage through the fourth TFT T04. In this case, the output node GOUT(N−2) of the (N−2)-th stage is discharged to VGL, and therefore the Q node of the N-th stage is also discharged to VGL.

FIG. 4 is a view showing an example of a stage circuit. FIG. 5A is an example waveform diagram showing a Q node floating period and a VGL floating period in the circuit shown in FIG. 4.

As shown in FIGS. 4 and 5A, the voltages of the Q node and of the output node GOUT(N) may fluctuate due to coupling with a clock signal in the floating periods. As shown in FIG. 5A, the floating period of the Q node Q corresponds to the low period of CLK(N−2). The low period of CLK(N−2) is a period in which a CLK(N−2) supply line is held at VGL. In the low period of CLK(N−2), the fourth TFT T04 is turned off and the other TFTs T01, T02, and T03 connected to the Q node are in the off state, so no voltage is applied directly to the Q node.

The floating period of the output node GOUT(N) is a VGL floating period, in which the voltage of the gate lines fluctuates during the period of time in which the voltage of the gate lines has to be held at VGL. The low period of CLK(N+4) is a period in which lines supplied with CLK(N+4) are held at VGL. In the low period of CLK(N+4), the sixth TFT T06 is turned off and the seventh TFT T07 is in the off state, so no voltage is applied directly to the output node GOUT(N). During the floating period of the Q node, the voltage of the output node GOUT(N) may fluctuate due to CLK(N), and a leakage current may be generated from TFTs, causing fluctuation of the pixel voltage.

Figure 6:
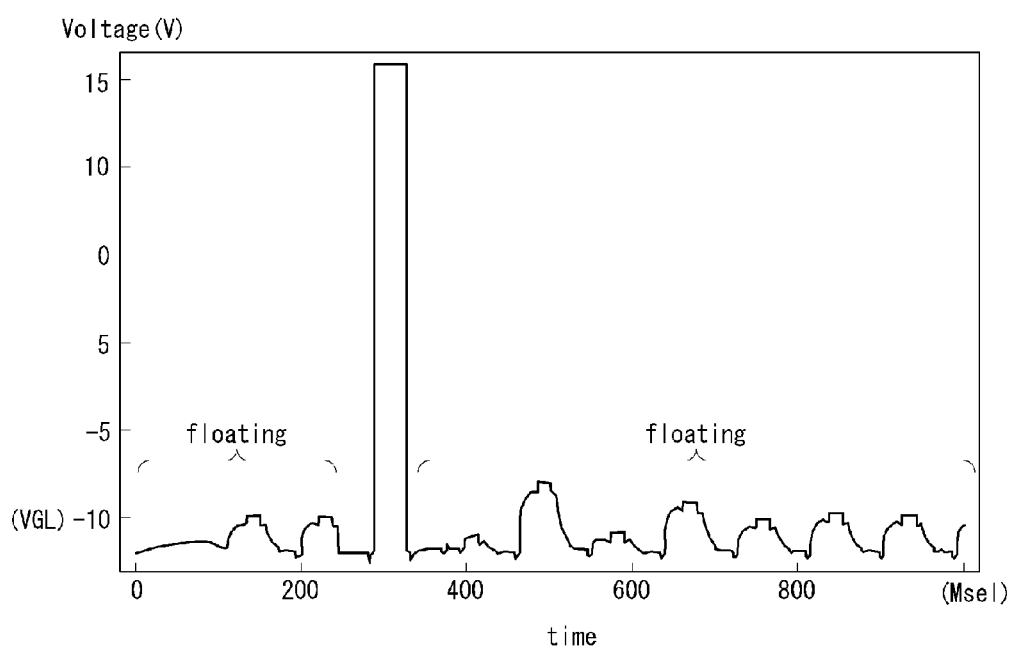
FIG. 6 is a waveform diagram showing fluctuation of VGL of gate lines during the Q node floating period and the output node floating period.

During the floating periods of the Q node and of the output node GOUT(N), the voltages of the Q node Q and of the output node GOUT(N) may fluctuate, affected by CLK(N) and the output of the previous stage GOUT(N−2) through a parasitic capacitance. Due to this, a leakage current may be generated from the fifth TFT T05, and the voltage of the gate lines may fluctuate in a period in which the voltage of the gate lines have to be held at VGL, as shown in FIG. 6. Once the voltage of the gate lines fluctuates in the period in which the voltage of the gate lines have to be held at VGL, the pixel voltage may fluctuate due to the leakage current form the TFTs.

Figure 5B:
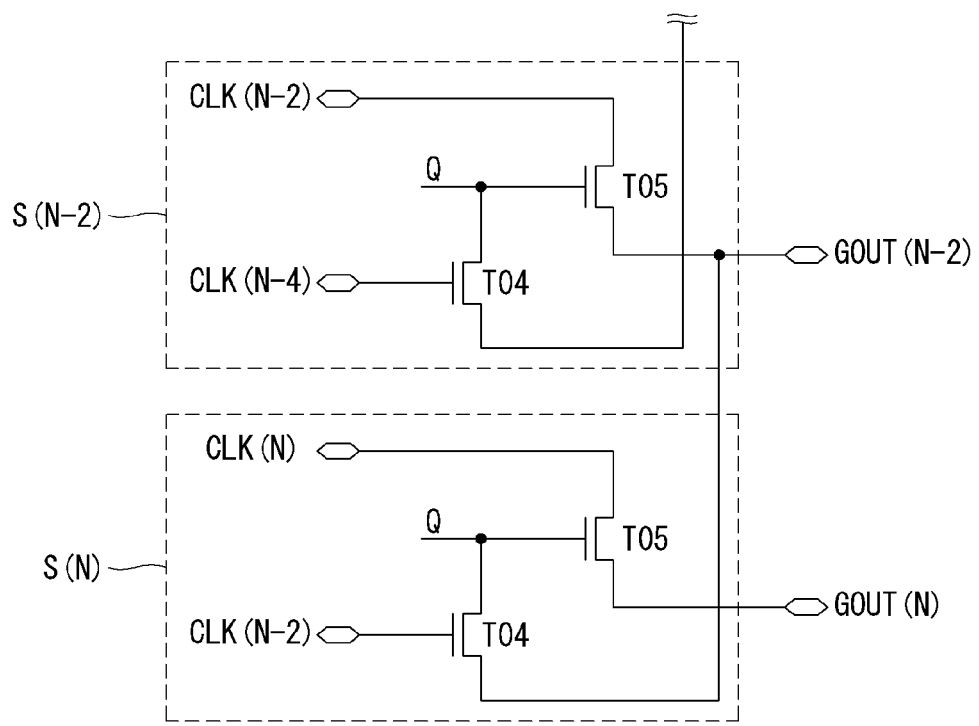

FIG. 5B shows signals that affect the Q node during a coupling of the Q node of the N-th stage. The fourth TFT T04 discharges the Q node to the output, i.e., VGL, of the (N−2)-th stage S(N−2) in response to CLK(N−2). During the low period of CLK(N−2), the fourth TFT T04 is off and therefore the Q node floats, thus causing the voltage of the Q node to fluctuate depending on CLK(N) and the voltage of GOUT(N−2).

A larger display panel has an increased number of gate lines connected to the gate drive circuit GIP. Thus, the fifth TFT T05 may be designed to be large in size (W/L, W is the channel width of the TFT and L is the channel path of the TFT), in order to prevent or reduce degradation of the output characteristics of the fifth TFT T05 caused by increased load. Although the size of the fifth TFT T05 may be decreased to reduce fluctuation of the output voltage of the gate drive circuit GIP in the Q node floating period and the output node GOUT(N) floating period, the output characteristics of the gate drive circuit may be degraded.

Figure 7A:
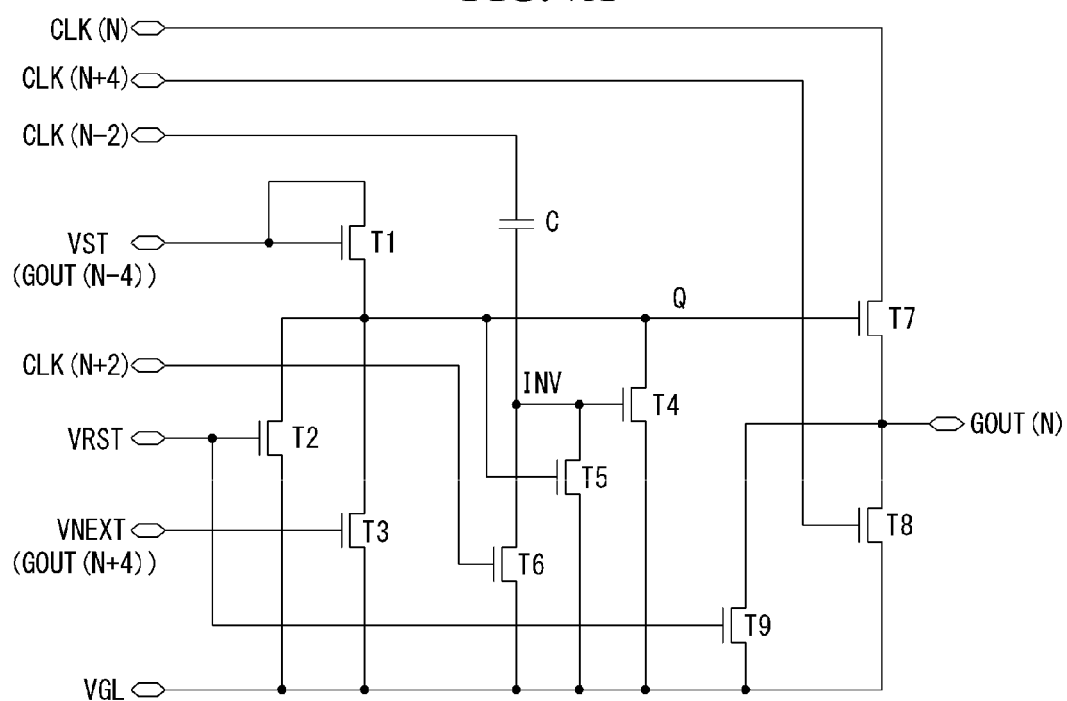
FIGS. 7A and 7B are circuit diagrams showing a gate drive circuit according to a first example embodiment of the present invention.

The example embodiments of the present invention can stabilize the Q node voltage of the gate drive circuit by controlling the voltage of the Q node with a use of an inverter circuit to which clock signals are supplied through a capacitor coupling, as shown in FIG. 7A.

Figure 7B:
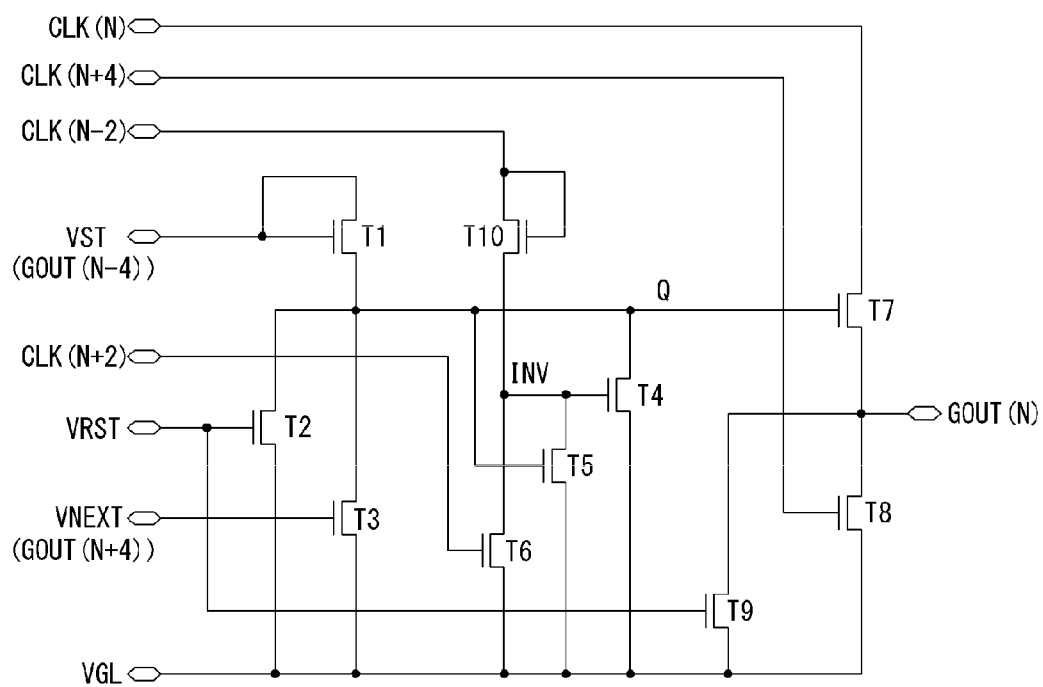
Figure 8:
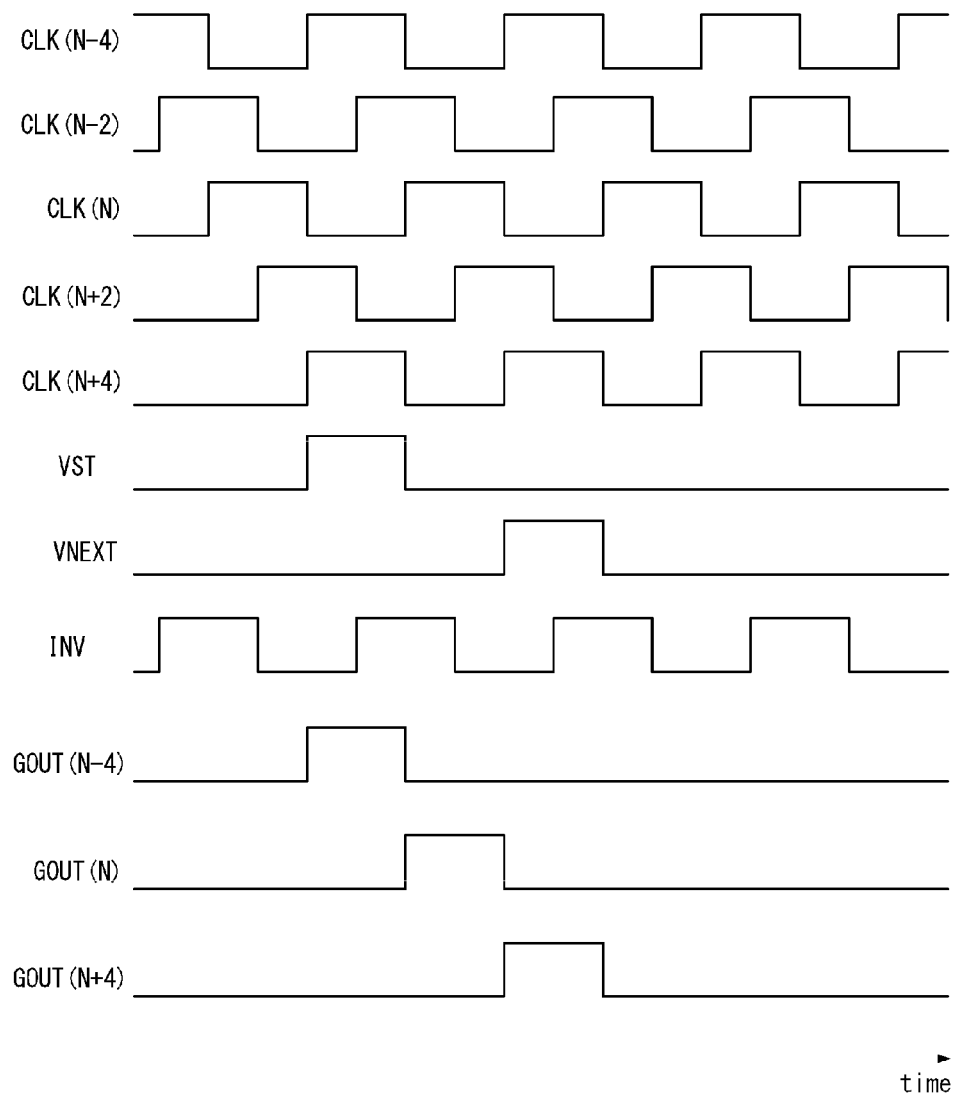
FIG. 8 is a waveform diagram showing input/output waveforms of the gate drive circuit of FIGS. 7A and 7B.
Figure 9A:
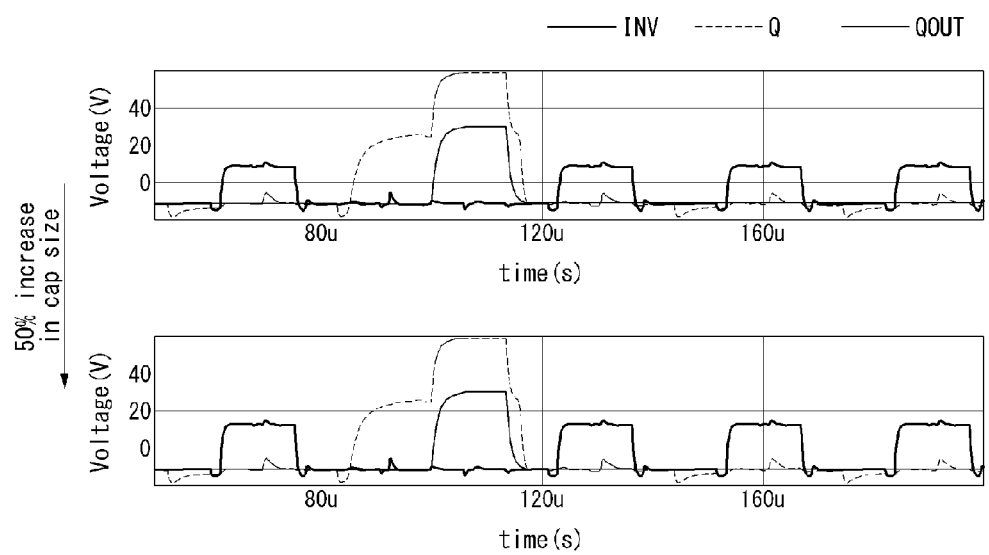
FIG. 9A is a waveform diagram showing the voltages of an inverter input node, Q node, and output node when a clock signal is supplied to an inverter circuit through a capacitor.
Figure 9B:
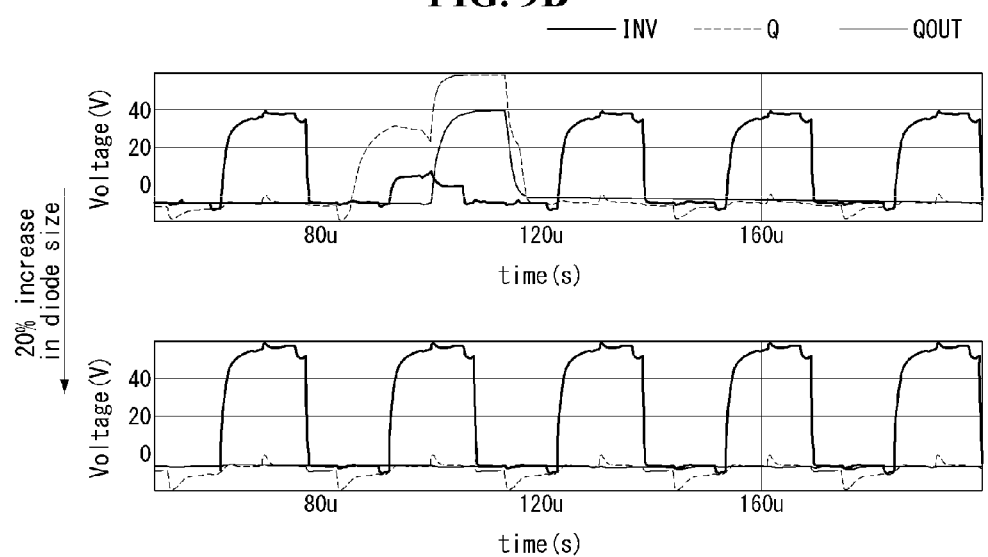
FIG. 9B is a waveform diagram showing the voltages of the inverter input node, Q node, and output node when a clock signal is supplied to the inverter circuit through a diode.

FIGS. 7A and 7B are circuit diagrams showing a gate drive circuit according to a first example embodiment of the present invention. FIG. 8 is an example waveform diagram showing input/output waveforms of the gate drive circuit of FIGS. 7A and 7B. FIG. 9A is an example waveform diagram showing the voltages of an inverter input node, of the Q node, and of the output node GOUT(N) when a clock signal is supplied to an inverter circuit through a capacitor as shown in FIG. 7A. FIG. 9B is an example waveform diagram showing the voltages of the inverter input node, of the Q node, and if the output node GOUT(N) when a clock signal is supplied to the inverter circuit through a diode as shown in FIG. 7B.

As shown in FIGS. 7A, 7B, 8, 9A, and 9B, the gate drive circuit according to the first example embodiment comprises a switching circuit for charging and discharging the Q node in response to a clock signal. This illustrated example gate drive circuit is a circuit for the N-th stage S(N) at which the shift register outputs an N-th gate pulse.

VST, shift clocks CLK(N), CLK(N−2), CLK(N+2), CLK(N+4), VRST, VNEXT, VGL, for example, are supplied to this stage. The phase of the clock signals is sequentially delayed in the following order: CLK(N−2), CLK(N), CLK(N+2), and CLK(N+4). The (N−4)-th stage generates an (N−4)-th gate pulse in response to CLK(N−4). The (N−2)-th stage generates an (N−2)-th gate pulse in response to CLK(N−2) whose phase is later than that of CLK(N−4). The N-th stage generates the N-th gate pulse in response to CLK(N) whose phase is later than that of CLK(N−2). The (N+2)-th stage generates an (N+2)-th gate pulse in response to CLK(N+2) whose phase is later than that of CLK(N). VRST is a reset signal that is applied simultaneously to all the stages and discharges and resets the Q nodes of those stages. VST is a start pulse or the output voltage of the previous stage. The output voltage of the previous stage may be the output voltage GOUT(N−4) of the (N−4)-th stage, but the present invention is not limited thereto. VNEXT is the output voltage of the next stage. The output voltage of the next stage may be the output voltage GOUT(N+4) of the (N+4)-th stage, but the present invention is not limited thereto. The clock signals, the output of the previous stage, and the output of the next stage may depend on such factors as, for example, whether gate pulses overlap or not, the respective pulse widths of the gate pulses, so the present invention is not limited to the examples illustrated in FIGS. 7A, 7B, and 8. VGL is the gate-low voltage. VST, the shift clocks CLK(N), CLK(N−2), and CLK(N+4), VRST, and VNEXT each swing between VGH and VGL.

The switching circuit may comprise, for example, an inverter circuit T4 and T5 to which CLK(N−2) is supplied through a capacitor coupling.

A first TFT T1 operates as a diode that supplies VST to the Q node Q and charges the Q node Q. The gate and drain of the first TFT T1 are connected to a VST node. The source of the first TFT T1 is connected to the Q node Q. A second TFT T2 discharges the Q node Q in response to VRST to reset the Q node Q. The gate of the second TFT T2 is connected to a VRST node. The drain of the second TFT T2 is connected to the Q node Q. The source of the second TFT T2 is connected to a VGL node. A third TFT T3 discharges the Q node Q in response to VNEXT. The gate of the third TFT T3 is connected to a VNEXT node. The drain of the third TFT T3 is connected to the Q node Q. The source of the third TFT T3 is connected to the VGL node.

The inverter circuit may comprise, for example, a fourth TFT T4 and a fifth TFT T5.

A fourth TFT T4 discharges the Q node Q in response to CLK(N−2) input through a capacitor C. The gate of the fourth TFT T4 is connected to an inverter input node INV, which is connected to a CLK(N−2) node through the capacitor C. The drain of the fourth TFT T4 is connected to the Q node Q. The source of the fourth TFT T4 is connected to the VGL node. The capacitor C is disposed between the CLK(N−2) node and the inverter input node INV. As shown in FIG. 9A, for example, the voltage of CLK(N−2) is transmitted to the inverter input node INV without delay, and the voltage of the inverter input node INV may be adjusted according to the capacitance.

A fifth TFT T5 discharges the inverter input node INV in response to the voltage of the Q node Q. The gate of the fifth TFT T5 is connected to the Q node Q. The drain of the fifth TFT T5 is connected to the inverter input node INV, and the source of the fifth TFT T5 is connected to the VGL node.

A sixth TFT T6 discharges the inverter input node INV in response to CLK(N+2). The gate of the sixth TFT T6 is connected to a CLK(N+2) node. The drain of the sixth TFT T6 is connected to the inverter input node INV, and the source of the sixth TFT T6 is connected to the VGL node.

A seventh TFT T7 is a pull-up transistor. The seventh TFT T7 causes gate pulses to rise by charging the output node GOUT(N) to the voltage of CLK(N) when the Q node Q is charged to VGH by VST. After the Q node is charged to VGH by VST, the voltage of the Q node rises up to 2VGH by bootstrapping, which, when CLK(N) is supplied, causes the potential to rise up to the voltage of the clock, thereby turning on the seventh TFT T7. The gate of the seventh TFT T7 is connected to the Q node. The drain of the seventh TFT T7 is connected to a CLK(N) node, and the output node GOUT(N) is connected to the source of the seventh TFT T7.

An eighth TFT T8 is a pull-down transistor that discharges the output node GOUT(N). The eighth TFT T8 causes gate pulses to fall by discharging the output node GOUT(N) in response to CLK(N+4). The gate of the eighth TFT T8 is connected to a CLK(N+4) node. The output node GOUT(N) is connected to the drain of the eighth TFT T8. VGL is supplied to the source of the eighth TFT T8.

A ninth TFT T9 is a pull-down transistor that discharges the output node GOUT(N) in response to VRST. The ninth TFT T9 has a gate connected to the VRST node, a source connected to the VGL node, and a drain connected to the output node GOUT(N).

In the example circuit shown in FIG. 7B, a diode, instead of the capacitor C of FIG. 7A, is connected between the CLK(N−2) node and the inverter input node INV. The diode may be implemented, for example, with a tenth TFT T10. In this example, the gate and drain of the tenth TFT T10 are connected to the CLK(N−2) node, and the source of the tenth TFT T10 is connected to the inverter input node INV.

In the first example embodiment shown in FIGS. 7A and 7B, the inverter circuit is connected to the Q node to reduce the floating period of the Q node. Also, voltage delays at the inverter input node INV and at the Q node can be reduced by supplying a clock signal, for example, CLK(N−2), to the inverter circuit through the capacitor C or a TFT T9 configured as a diode. FIGS. 9A and 9B are example test results showing the voltages of the inverter input node INV, of the Q node Q, and of the output node GOUT(N) when the voltage of a clock signal is transmitted to the inverter circuit through the capacitor C (FIG. 9A) or the diode T9 (FIG. 9B). The capacitor C can transmit the voltage of a clock signal to the inverter input node INV without a delay even if the channel length of the pull-up transistor T7 is increased to 15,000 µm to accommodate the large-screen load. The voltage of the inverter input node INV may be properly adjusted according to the capacitance of the capacitor C. By increasing the capacitance of the capacitor C, the voltage of the inverter input node INV can be increased.

The diode T9 may transmit a clock signal to the inverter input node INV at a higher voltage than the capacitor C can. However, the diode T9 may cause more delays than the capacitor C, and the voltage of each node may fluctuate more depending on the size of the diode, making it more difficult to optimize the output characteristics of the pull-up transistor. Hence, it is more preferable that clock signals are transmitted to the inverter circuit through the capacitor C.

The example embodiments of the present invention may allow for recovery from a shift in the threshold voltage of the pull-down transistor caused by a DC gate bias voltage by applying a reverse bias to the pull-down transistor of the gate drive circuit GIP when the power to the display device is turned off. It is to be noted that this method of compensating for a gate bias stress on the pull-down transistor is applicable to all of the example embodiments, as can be seen for example from FIG. 10.

Figure 10:
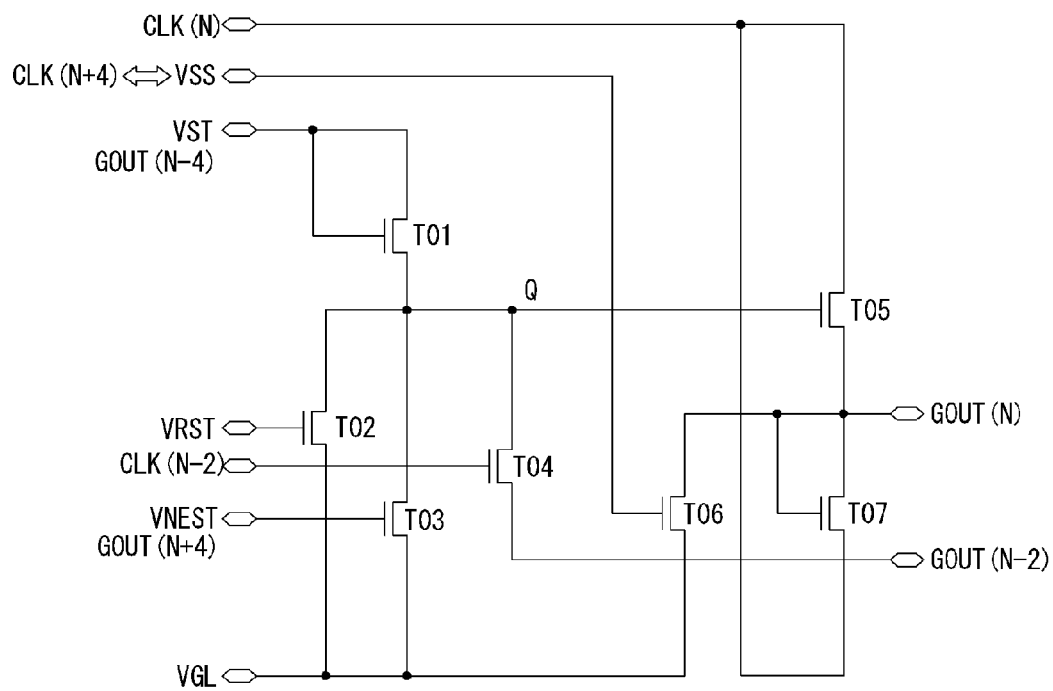
FIG. 10 is a circuit diagram showing a gate drive circuit according to a second example embodiment of the present invention.
Figure 11:
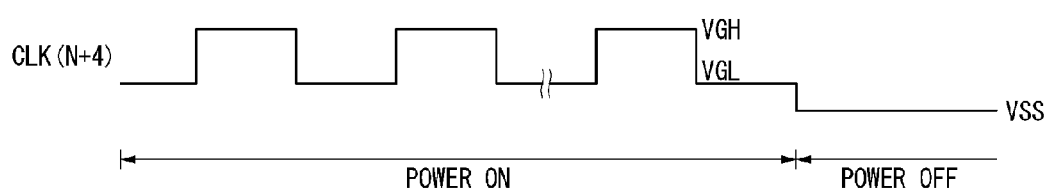
FIG. 11 is a waveform diagram showing gate voltages of a pull-down transistor.

FIG. 10 is a circuit diagram showing a gate drive circuit according to a second example embodiment of the present invention. FIG. 11 is an example waveform diagram showing gate voltages of a pull-down transistor in FIG. 10.

As shown in FIGS. 10 and 11, the N-th stage of the gate drive circuit according to the second example embodiment comprises a switching circuit for charging or discharging the Q node in response to a clock signal. The switching circuit may include a plurality of switching elements T01 to T07.

The sixth TFT T06 is a pull-down transistor that discharges the output node GOUT(N). The voltage of the gate lines are to be held at the VGL potential, except during gate pulse periods for supplying data voltages to the pixels. Accordingly, VGH may be supplied to the gate of the sixth TFT T06 for most of the time in a frame period for nearly every frame, and therefore the threshold voltage may be shifted due to a positive bias stress.

In the example embodiments of the present invention, VSS, which is lower than VGL, may be applied to the gate of the sixth TFT T06 for a predetermined period of time after the power to the display is turned off so that the display panel is not driven, thereby supplying a reverse bias voltage between the gate and source of the sixth TFT T6. The gate-source voltage Vgs of the sixth TFT T6 may be a negative voltage during this predetermined period of time after a power off. As a result, the example embodiments of the present invention enable recovery from the shift in threshold voltage caused by the positive bias stress on the sixth TFT T6 during the time the display device is powered on.

Figure 12:
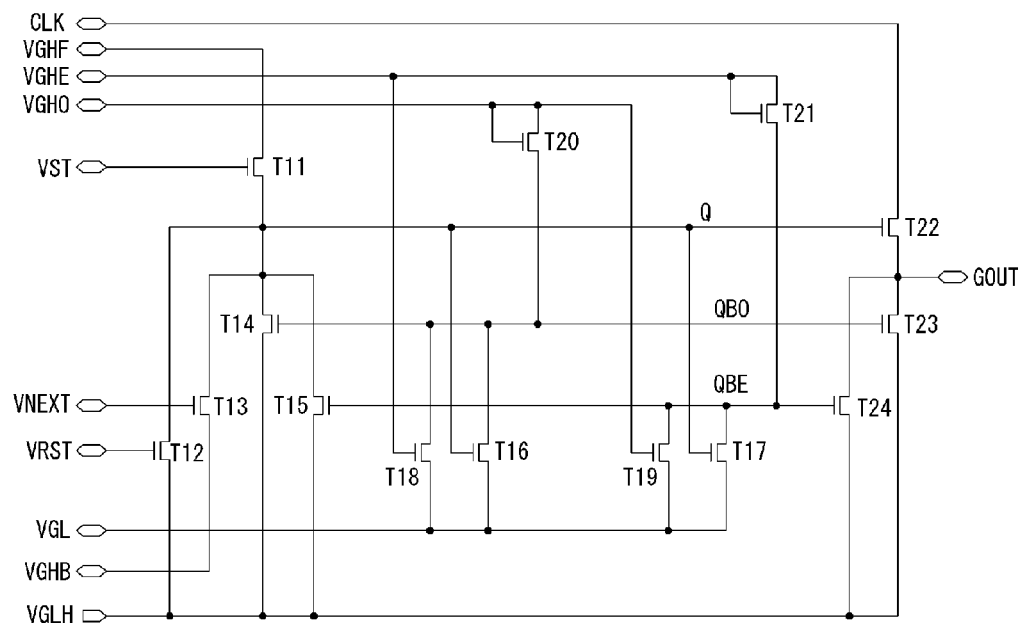
FIG. 12 is a circuit diagram showing a gate drive circuit according to a third example embodiment of the present invention.

CLK(N+4) swinging between VGH of 28V and VGL of 5V, for example, may be supplied to the gate of the sixth TFT T6 during the time the display device is powered on, as shown in FIG. 12, and VSS of 0, for example, may be supplied thereto for a predetermined period of time after a power off.

This example embodiment may be applied to the example gate drive circuits of FIGS. 4, 7A, and 7B.

Figure 13:
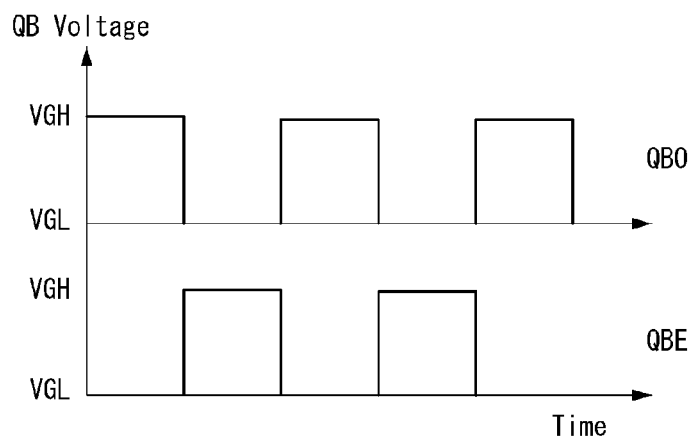
FIG. 13 is a waveform diagram showing the voltage of the QB nodes shown in FIG. 12.
Figure 14:
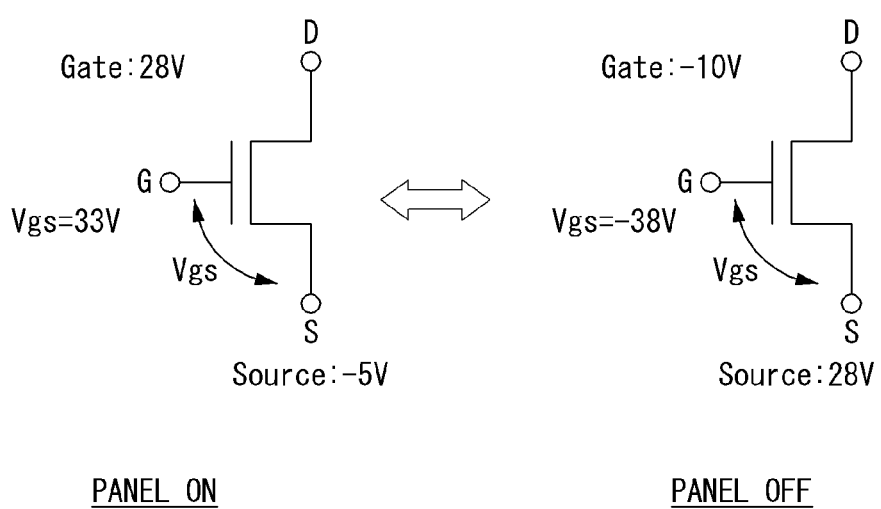
FIG. 14 is a view showing the gate-source voltage Vgs of pull-down transistors when the display device is in the power-on state and when the display device is in the power-off state.

FIG. 12 is a circuit diagram showing a gate drive circuit according to a third example embodiment of the present invention. FIG. 13 is an example waveform diagram showing the voltage of the QB nodes shown in FIG. 12. FIG. 14 is a view showing the gate-source voltage Vgs of example pull-down transistors when the display device is in the power-on state and when the display device is in the power-off state, respectively.

As shown in FIGS. 12 and 13, an N-th stage of the gate drive circuit may compensate for a gate bias stress on pull-down transistors T23 and T24 connected to QB nodes QBO and QBE by converting the QB node voltage to a DC voltage. Also, this example gate drive circuit allows for recovery from the shift in the threshold voltage by applying a reserve bias to the pull-down transistors T23 and T24 during the power-off period in which the display panel PNL is not driven.

VGHF, VGHE, VGHO, VGHB, VGLH, VST, CLK, VRST, and VNEXT, for example, may be supplied to this stage. VRST is a reset signal that is applied simultaneously to all the stages, and discharges and resets the Q nodes of those stages. During the time the display device is powered on, the module power supply part PWIC generates VGHF and VGHB, for example, at VGH of 28V.

VGHO and VGHE are alternately generated at the VGH potential during the power on period in order to diminish the bias stress on the pull-down transistors T23 and T24, and then are alternately inverted to the VGL potential. Then, in order to apply a reverse bias to the pull-down transistors T23 and T24 for a predetermined period of time after a power off, VGHE and VGHO may be adjusted to a voltage (e.g., VGL of −5V) lower than 0V, and VGLH may be adjusted to a voltage (e.g., VGH of 28V) higher than 0V. Accordingly, the reverse bias is applied to the pull-down transistors T23 and T24 for a predetermined period of time after a power off, thereby enabling recovery from the threshold voltage shift.

VST is a start pulse or the output voltage of the previous stage. VNEXT is the output voltage of the next stage. The clock signals, the output of the previous stage, and the output of the next stage may depend on such factors as, for example, whether gate pulses overlap or not, the respective pulse width of the gate pulses. VST, CLK, VRST, and VNEXT each swing between VGH and VGL.

A first TFT T11 charges the Q node Q by supplying VGHF to the Q node Q in response to VST. The gate of the first TFT T11 is connected to a VST node. The drain of the first TFT T11 is connected to a VGHF node. The source of the first TFT T11 is connected to the Q node Q. A second TFT T12 discharges the Q node Q in response to VRST to reset the Q node Q. The gate of the second TFT T12 is connected to a VRST node. The drain of the second TFT T12 is connected to the Q node Q. The source of the second TFT T12 is connected to a VGLH node. A third TFT T13 discharges the Q node Q in response to VNEXT. The gate of the third TFT T13 is connected to a VNEXT node. The drain of the third TFT T13 is connected to the Q node Q. The source of the third TFT T13 is connected to the VGHB node.

A fourth TFT T14 discharges the Q node Q in response to a first QB node QBO. The gate of the fourth TFT T14 is connected to the first QB node QBO. The drain of the fourth TFT T14 is connected to the Q node Q. The source of the fourth TFT T14 is connected to the VGLH node. A fifth TFT T15 discharges the Q node Q in response to a second QB node QBE. The gate of the fifth TFT T15 is connected to the second QB node QBE. The drain of the fifth TFT T15 is connected to the Q node Q. The source of the fifth TFT T15 is connected to the VGLH node.

If a DC voltage is applied to the QB nodes for a long time, the respective threshold voltages of the pull-down transistors T23 and T24 connected to the QB nodes are shifted due to a gate bias stress. To diminish the gate bias stress, VGHE and VGHO may be alternately generated at predetermined time intervals. Accordingly, the voltages of the first and second QB nodes QBO and QBE may be alternately charged and discharged as shown in FIG. 13.

A sixth TFT T16 discharges the first QB node QBO in response to the Q node Q. The gate of the sixth TFT T16 is connected to the Q node Q. The drain of the sixth TFT T16 is connected to the first QB node QBO. The source of the sixth TFT T16 is connected to a VGL node. A seventh TFT T17 discharges the second QB node QBE in response to the Q node Q. The gate of the seventh TFT T17 is connected to the Q node Q. The drain of the seventh TFT T17 is connected to the second QB node QBE. The source of the seventh TFT T17 is connected to the VGL node An eighth TFT T18 discharges the first QB node QBO in response to VGHE. The gate of the eighth TFT T18 is connected to a VGHE node. The drain of the eighth TFT T18 is connected to the first QB node QBO. The source of the eighth TFT T18 is connected to the VGL node. A ninth TFT T19 discharges the second QB node QBE in response to VGHO. The gate of the ninth TFT T19 is connected to a VGHO node. The drain of the ninth TFT T19 is connected to the second QB node QBE. The source of the ninth TFT T19 is connected to the VGL node.

A tenth TFT T20 operates as a diode and charges the first QB node QBO with VGHO. The gate and drain of the tenth TFT T20 are connected to the VGHO node. The source of the tenth TFT T20 is connected to the first QB node QBO. An eleventh TFT T21 operates as a diode and charges the second QB node QBE with VGHE. The gate and drain of the eleventh TFT T21 are connected to the VGHE node. The source of the eleventh TFT T21 is connected to the second QB node QBE.

A twelfth TFT T22 is a pull-up transistor. The twelfth TFT T22 causes gate pulses to rise by charging the output node GOUT with the voltage of CLK when the Q node Q is charged to VGHF. The gate of the twelfth TFT T22 is connected to the Q node. The drain of the twelfth TFT T22 is connected to a CLK node, and the output node GOUT is connected to the source of the twelfth TFT T22.

A thirteenth TFT T23 is a first pull-down transistor that discharges the voltage of the output node GOUT in response to the voltage of the first QB node QB0. The gate of the thirteenth TFT T23 is connected to the first QB node QB0. The drain of the thirteenth TFT T23 is connected to the output node GOUT. The source of the thirteenth TFT T23 is connected to the VGLH node.

A fourteenth TFT T24 is a second pull-down transistor that discharges the voltage of the output node in response to the voltage of the second QB node QBE. The gate of the fourteenth TFT T24 is connected to the second QB node QBE. The drain of the fourteenth TFT T24 is connected to the output node GOUT. The source of the fourteenth TFT T24 is connected to the VGLH node.

As shown in FIG. 14, the gate-source voltage Vgs of each of the pull-down transistors T23 and T24 is a positive voltage during the power-on period of the display device. During the power-on period, the gates of the pull-down transistors T23 and T24 are supplied with, for example, VGH of 28V, except during the Q node charging period, and the sources of the pull-down transistors T23 and T24 are supplied with, for example, VGLH and VGL of −5V. Accordingly, during the power-on period of the display device, the threshold voltage of the pull-down transistors T23 and T24 may be shifted to a positive voltage due to a positive gate bias stress.

In contrast, the gate-source voltage Vgs of each of the pull-down transistors T23 and T24 is a negative voltage during the power-off period of the display device. For a predetermined period of time after a power-off, VGL of −5V or −10V, for example, is supplied to the gates of the pull-down transistors T23 and T24, and VGH of 28V, for example, is supplied to the sources of the pull-down transistors T23 and T24. Accordingly, for a predetermined period of time after the power-off of the display device, the threshold voltage of the pull-down transistors T23 and T24 may be shifted to a negative voltage due to a reverse bias. This enables recovery from the threshold voltage shift.

When the voltage of VGLH applied to the sources of the pull-down transistors T23 and T24 is changed to VGH in order to apply a reverse bias to the pull-down transistors T23 and T24, the pull-up transistor T22 may be turned on and gate pulses having the VGH potential may be generated. In this case, if the display panel is being driven, an abnormal variation of the displayed image or a flicker may occur due to a fluctuation of the pixel voltage. To prevent this potential problem, it is preferable that a reverse bias is applied to the pull-down transistors T23 and T24 when the display panel is in the power-off state. Since the pixels are not driven during the power-off period of the display panel, no image is displayed. In the case of a liquid crystal display, for example, the backlight unit is turned off during the power-off period, and hence no light is transmitted from the pixels.

While the gate drive circuits according to the foregoing example embodiments have been described with respect to n-type MOSFET switching elements, they may be implemented with p-type MOSFET switching elements as well. In this case, the positions of the drains and sources of the TFTs would be reversed.

As described above, the example embodiments of the present invention allow for stabilization of the Q node voltage and the output node voltage GOUT as the floating period of the Q node is reduced by connecting an inverter circuit for receiving clock signals to the Q node and supplying the clock signals to the inverter circuit through a capacitor coupling or a diode. Furthermore, the example embodiments of the present invention allow for recovery from a threshold voltage shift caused by a gate bias stress on a pull-down transistor by applying a reverse bias to the pull-down transistor for a predetermined period of time after the display device is powered off, thereby improving the reliability and lifetime of the display device.

It will be apparent to those skilled in the art that various modifications and variations can be made in the gate drive circuit and the display device using the same according to the present invention without departing from the spirit or scope of the invention. Thus, it is intended that the present invention cover the modifications and variations of this invention provided they come within the scope of the appended claims and their equivalents.

What is claimed is:

1. A gate drive circuit for a display device having a plurality of gate lines, the gate drive circuit comprising:
   a pull-up transistor configured to charge an output node to a voltage of a first clock signal based on a voltage of a Q node, the pull-up transistor having a gate connected to the Q node, a drain configured to receive the first clock signal, and a source connected to the output node, the output node being connected to a corresponding one of the gate lines;
   an inverter circuit configured to control the voltage of the Q node based on a second clock signal received via an inverter input node, the inverter circuit including:
      a first transistor having a gate configured to receive the second clock signal via the inverter input node, a drain connected to the Q node, and a source configured to receive a first low-potential voltage, and
      a second transistor having a drain connected to the inverter input node, a gate connected to the Q node, and a source configured to receive the first low-potential voltage;
   a third transistor having a gate configured to receive a third clock signal, a drain connected to the inverter input node, and a source configured to receive the first low-potential voltage; and
   a pull-down transistor configured to discharge a voltage of the output node to the first low-potential voltage in response to a fourth clock signal, the pull-down transistor having a gate configured to receive the fourth clock signal, a drain connected to the output node, and a source configured to receive the first low-potential voltage,
   wherein phases of the first to the fourth clock signals are sequentially delayed in order of the second clock signal, the first clock signal, the third clock signal and the fourth clock signal.

2. The gate drive circuit of claim 1, further comprising a capacitor configured to receive the second clock signal and provide the second clock signal to the inverter input node.

3. The gate drive circuit of claim 1, further comprising a diode configured to receive the second clock signal and provide the second clock signal to the inverter input node.

4. The gate drive circuit of claim 1, wherein the gate of the pull-down transistor is configured to receive the fourth clock signal when the display device is powered on and is configured to receive a second low-potential voltage lower than the first low-potential voltage after the display device is powered off.

5. The gate drive circuit of claim 1, wherein a gate-source voltage of the pull-down transistor is a positive voltage when the display device is powered on and is a negative voltage when the display device is powered off.

6. The gate drive circuit of claim 1, further comprising:
   a fourth transistor configured to supply an output voltage of a previous gate line to the Q node, the fourth transistor having a gate and a drain connected to an output node of the previous gate line and a source connected to the Q node; and a fifth transistor configured to discharge the Q node in response to an output voltage of a next gate line, the fifth transistor having a gate connected to an output node of the next gate line, a drain connected to the Q node and a source connected to the first low-potential voltage.

7. A display device, comprising:
a display panel having data lines and gate lines intersecting each other and pixels arranged in a matrix form;
a timing controller configured to supply a first clock signal, a second clock signal, a third clock signal, and a fourth clock signal;
a data drive circuit configured to supply a data signal to the data lines; and
a gate drive circuit configured to supply a gate pulse synchronized with the data signal to the gate lines, the gate drive circuit including:
  a pull-up transistor configured to charge an output node to a voltage of the first clock signal based on a voltage of a Q node, the pull-up transistor having a gate connected to the Q node, a drain configured to receive the first clock signal, and a source connected to the output node, the output node being connected to a corresponding one of the gate lines;
  a pull-down transistor configured to discharge a voltage of the output node to a first low-potential voltage in response to the fourth clock signal, the pull-down transistor having a gate configured to receive the fourth clock signal, a drain connected to the output node, and a source configured to receive the first low-potential voltage;
  an inverter circuit configured to control the voltage of the Q node based on the second clock signal received via an inverter input node, the inverter circuit including:
    a first transistor having a gate configured to receive the second clock signal via the inverter input node, a drain connected to the Q node, and a source configured to receive the first low-potential voltage, and
    a second transistor having a drain connected to the inverter input node, a gate connected to the Q node, and a source configured to receive the first low-potential voltage; and
    a third transistor having a gate configured to receive the third clock signal, a drain connected to the inverter input node, and a source configured to receive the first low-potential voltage,
  wherein phases of the first to the fourth clock signals are sequentially delayed in order of the second clock signal, the first clock signal, the third clock signal and the fourth clock signal.

8. The display device of claim 7, wherein the gate drive circuit further includes a capacitor configured to receive the second clock signal and provide the second clock signal to the inverter input node.

9. The display device of claim 7, wherein the gate drive circuit further includes a diode configured to receive the second clock signal and provide the second clock signal to the inverter input node.

10. The display device of claim 7, further comprising an auxiliary power supply configured to drive the timing controller for a predetermined period of time after a power to the display device is turned off,
wherein the gate of the pull-down transistor is configured to receive the fourth clock signal when the power to the display device is turned on and is configured to receive a second low-potential voltage lower than the first low-potential voltage during the predetermined period of time after the power to the display is turned off.

11. The display device of claim 10, wherein a gate-source voltage of the pull-down transistor is a positive voltage when the power to the display device is turned on and is a negative voltage during the predetermined period of time after the power to the display is turned off.

12. The display device of claim 7, further comprising:
a fourth transistor configured to supply an output voltage of a previous gate line to the Q node, the fourth transistor having a gate and a drain connected to an output node of the previous gate line and a source connected to the Q node; and
a fifth transistor configured to discharge the Q node in response to an output voltage of a next gate line, the fifth transistor having a gate connected to an output node of the next gate line, a drain connected to the Q node and a source connected to the first low-potential voltage.

* * * * *